UNITED STATES PATENT OFFICE.

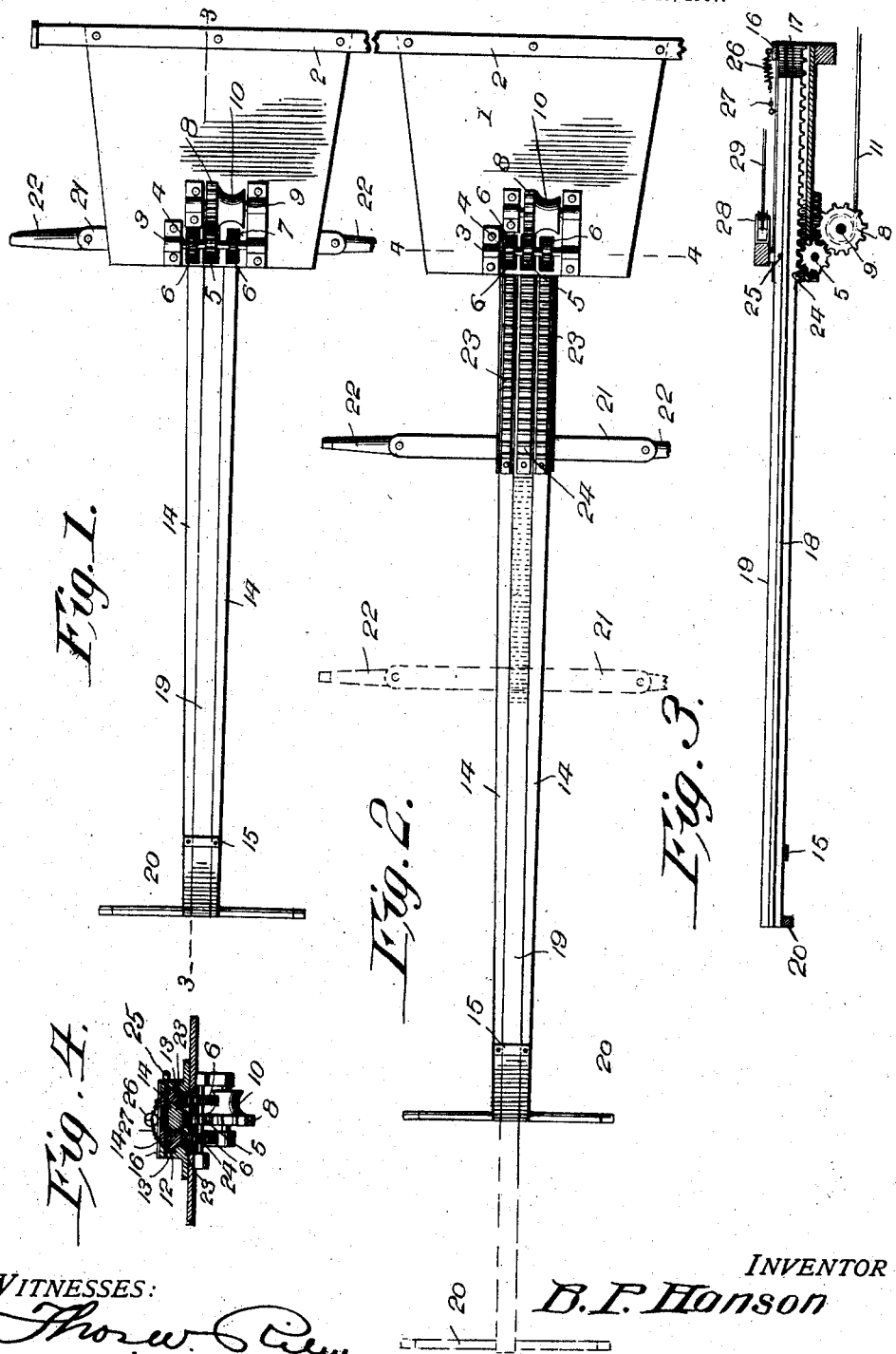

BENNIE P. HANSON, OF PARKERSBURG, IOWA.

VEHICLE-TONGUE.

No. 866,130.   Specification of Letters Patent.   Patented Sept. 17, 1907.

Application filed February 27, 1906, Serial No. 303,238. Renewed July 19, 1907. Serial No. 384,609.

*To all whom it may concern:*

Be it known that I, BENNIE P. HANSON, a citizen of the United States, residing at Parkersburg, in the county of Butler and State of Iowa, have invented certain new and useful Improvements in Vehicle-Tongues; and I do hereby declare the following to be a full, clear, and exact description of the invention, such as will enable others skilled in the art to which it appertains to make and use the same.

My invention relates to vehicle tongues and it is more particularly a tongue adapted for use in connection with the apparatus described by me in an application filed on the 25th of January, 1906, Serial Number 297,860.

The object of the invention is to provide a longitudinally movable, sectional tongue adapted to operate mechanism which can be utilized for operating suitable devices such as the fork of a manure loader of the construction disclosed in my application aforesaid.

A still further object is to so construct the tongue as to permit two distinct operations to be performed thereby during its extension.

With the above and other objects in view, the invention consists of a tongue formed of telescopic sections and to these sections are connected the draft appliances such as the neck yoke and the swingle trees. All of the sections are provided with longitudinally disposed racks adjacent their rear ends which mesh with gears mounted on a shaft connected to a supporting plate which is adapted to be supported in any desired manner on the front axle of a vehicle. These gears, when rotated, operate a drum to which is adapted to be secured one end of a cable so that when the drum is revolved, the cable will be wound thereon. Another cable is adapted to be connected to the trees so as to be operated independently of the rotation of the gears as will be hereinafter more fully disclosed.

The invention also consists of the further novel features of construction and combination of parts, the preferred form whereof will be hereinafter made clearly apparent and pointed out in the claims, reference being had to the accompanying drawings which are made a part of this application, and in which—

Figure 1 is a bottom plan view of a tongue and mechanism constructed in accordance with my invention, said tongue being shown secured to the front axle of a vehicle. Fig. 2 is a view similar to Fig. 1 but showing in full lines the position of the parts when extended to compel the operation of the gears and disclosing in dotted lines the manner of further extending the telescopic tongue. Fig. 3 is a vertical, longitudinal section on line 3—3 Fig. 1, and, Fig. 4 is a section on line 4—4 Fig. 2.

Referring to the figures by numerals of reference, 1 is a supporting plate adapted to be fastened in any suitable manner to the front axle 2 of a vehicle such as a manure spreader of the construction covered by my application hereinbefore mentioned. This supporting plate has brackets 3 secured upon its lower face and in two of the brackets is journaled a shaft 4 on which is fastened gears 5 and 6 which project through slots 7 formed in the supporting plate. The intermediate gear 5 meshes with a gear 8 secured to a shaft 9 on which is fastened a drum 10. To this drum is adapted to be fastened one end of a cable 11 which can be utilized for any desired purpose, preferably for moving rearwardly the fork of a manure loader, although said cable may be utilized for any other purpose desired.

Mounted on the upper face of the supporting plate 1 are parallel guide strips 12 having grooves in their inner or adjoining faces into which project tongues 13 formed longitudinally upon the sides of parallel tongue members 14, which members are rigidly fastened by means of cross strips 15 and 16 secured thereto adjacent their front and rear ends, respectively. The inner or adjoining faces of these tongue members 14 are also grooved longitudinally as shown at 17 to receive tongues 18 extending longitudinally upon opposite faces of the intermediate tongue member 19. To the front end of this last mentioned member is fastened a neck-yoke 20 and an equalizer 21 having swingle trees 22 thereon is secured to the member 19 at such a point that, when the tongue members are in their normal positions, said equalizer will assume a position under the forward portion of the supporting plate 1, as shown in Fig. 1. All three of the members 14 and 19 have longitudinally disposed racks 23 and 24 respectively, said racks being so located that their forward ends engage the gears 5 and 6 when the tongue members are in their normal positions. These members are adapted to be locked in normal positions by means of a pin 25 extending therethrough and through the guide strips 12. A coiled spring 26 is fastened to the rear cross strip 16 and is connected to the side tongue members 14 by means of chains 27. These chains are normally slack so that the spring will not be tensioned until after the members 14 have moved a considerable distance from their normal positions.

A pulley 28 is preferably fastened to the central portion of the equalizer 21 and is adapted to be engaged by a cable 29 which may be utilized for hoisting a fork of a manure loader or for any other suitable purpose.

It will be understood that the draft animals are to be harnessed to the neck-yoke 20 and to swingle trees in the usual manner and while the pin 25 is in engagement with the tongue members, the vehicle will be carried forward in the usual manner when the draft animals pull upon the tongue. However, should it be desired to utilize the forward movement of the draft animals for operating mechanism upon the vehicle while said vehicle is stationary, the pin 23 is removed and as the animals travel forward, the tongue members will be pulled over the gears 5 and 6 and cause them to rotate, thereby winding the cable 11 on drum 10. The intermediate member 19 of the tongue is shorter than the side members and therefore the rack 24 thereon becomes disengaged from gear 5 just before the ends of the racks 23 pass from their gears 6. It will therefore be understood that as soon as the rack 24 becomes disengaged from the gear 5, the tongue member 19 is released from the gears although the other tongue members 14 remain in engagement therewith. The further movement of the draft animals will result in the member 19 being drawn longitudinally from between the side members as shown by dotted lines in Fig. 2 and this movement may be continued until the rack 24 is stopped by the front cross strip 15. This forward movement of the member 19 of course carries the pulley 28 forward and the cable 29 will therefore be pulled longitudinally so as to operate any mechanism to which it may be connected. When the rack 24 comes into contact with the cross strip 15 and is stopped thereby, the sudden stoppage of the mechanism will be prevented by the coiled spring 26 because the intermediate member 19 will pull the cross strip 15 and side members 14 forward slightly so as to tension the spring 26 and bring the draft animals to a gradual stop and without injuring the mechanism.

To return the parts to their original positions it is merely necessary to back the draft animals so as to pull back the members 19 and 14 respectively and loosen cable 29 and unwind the cable 11.

As heretofore stated the tongue herein described is particularly adapted for use with the apparatus described and claimed by me in another application and it will be found of particular advantage with said apparatus because, by utilizing this tongue, two separate operations of projecting the manure fork rearwardly and of lifting said fork, can be performed successively during one forward movement of the draft animals instead of by two separate movements as heretofore.

What I claim as new is:—

1. The combination with a supporting plate having rotatable mechanism thereon; of a telescopic tongue supported by said plate, all portions of said tongue being movable longitudinally and adapted to operate the mechanism, one portion of the tongue being longitudinally movable independently of the remainder of the tongue.

2. The combination with a supporting plate having mechanism connected thereto; of a telescopic tongue, all portions of which are movable longitudinally upon the plate, a portion of said tongue permanently engaging and adapted to actuate the mechanism, and another portion thereof being normally but not permanently in engagement with the mechanism.

3. The combination with a support; of a telescopic tongue comprising members movable longitudinally upon the support and horizontally parallel with each other, mechanism connected to the support and normally engaging and adapted to be actuated by the tongue during a portion of its extension.

4. The combination with a support, of a telescopic tongue movable longitudinally upon the support, mechanism connected to the support and normally engaging and adapted to be actuated by the tongue during a portion of its extension, and a resilient stop for limiting the movement of the tongue in one direction.

5. The combination with a support having a drum thereon and mechanism for rotating said drum; of actuating means for said mechanism comprising a longitudinally movable, telescopic vehicle tongue, and racks upon the members of the tongue engaging and adapted to actuate the mechanism.

6. The combination with a support having mechanism thereon; of a tongue member longitudinally movable upon the support and permanently engaging the mechanism, a resilient stop for said tongue member, a second longitudinally movable tongue member telescoping the first mentioned member, and a rack thereon for engaging the mechanism during a portion of the movement of said second member.

7. The combination with a support having a drum thereon and gears for rotating the drum; of a longitudinally movable tongue member mounted on the support, a rack thereon engaging a gear and adapted to actuate the same, a second tongue member slidably connected to the first mentioned member, means for limiting the movement of said second member, and a rack upon said member adapted to engage a gear during a portion of the movement of the member.

8. The combination with a support having a drum thereon and gears for rotating the drum; of a longitudinally movable tongue member mounted on the support, a rack thereon engaging a gear and adapted to actuate the same, a second tongue member slidably connected to the first mentioned member, means for limiting the movement of said second member, a rack upon said member adapted to engage a gear during a portion of the movement of the member, a cable-engaging device connected to said second member, and a resilient stop for limiting the movement of the members in one direction.

9. The combination with a support having a drum thereon and gears for rotating the drum; of a rear tongue member longitudinally movable upon the support, a rack thereon engaging a gear, a front tongue member slidably connected to the rear member, draft devices connected thereto, a rack upon the front member adapted to engage one of the gears during a portion of the movement of said front member, and a cable-engaging device movable with the front member.

In testimony whereof I have signed my name to this specification in the presence of two subscribing witnesses.

BENNIE P. HANSON.

Witnesses:
 W. T. EVANS,
 LEW JONES.